No. 721,851. PATENTED MAR. 3, 1903.
J. ARBUCKLE.
APPARATUS FOR EXTRICATING STRANDED VESSELS.
APPLICATION FILED APR. 26, 1902.
NO MODEL. 5 SHEETS—SHEET 1.

WITNESSES:

INVENTOR:
John Arbuckle,
By Attorneys,

No. 721,851. PATENTED MAR. 3, 1903.
J. ARBUCKLE.
APPARATUS FOR EXTRICATING STRANDED VESSELS.
APPLICATION FILED APR. 26, 1902.
NO MODEL. 5 SHEETS—SHEET 2.

WITNESSES:
René Bruine
Fred White

INVENTOR:
John Arbuckle,

By Attorneys,

No. 721,851. PATENTED MAR. 3, 1903.
J. ARBUCKLE.
APPARATUS FOR EXTRICATING STRANDED VESSELS.
APPLICATION FILED APR. 26, 1902.
NO MODEL. 5 SHEETS—SHEET 3.
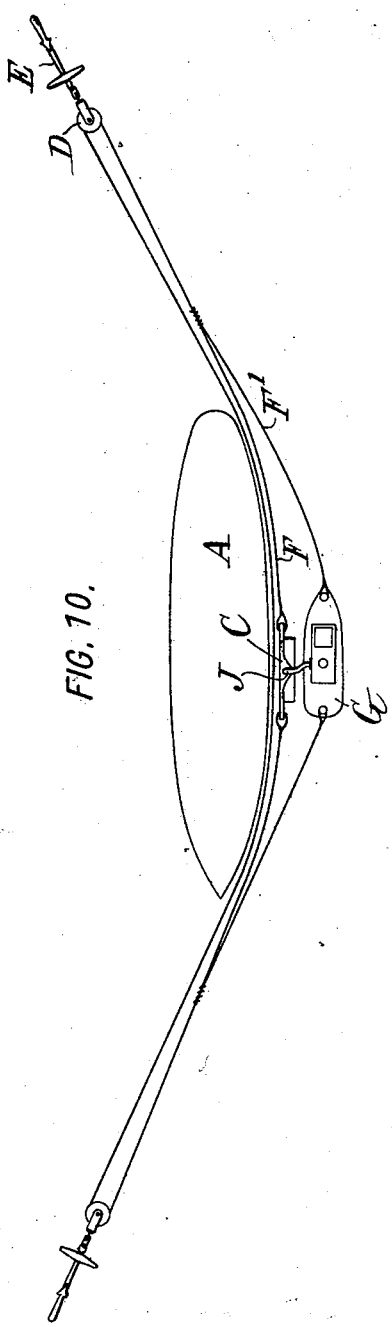
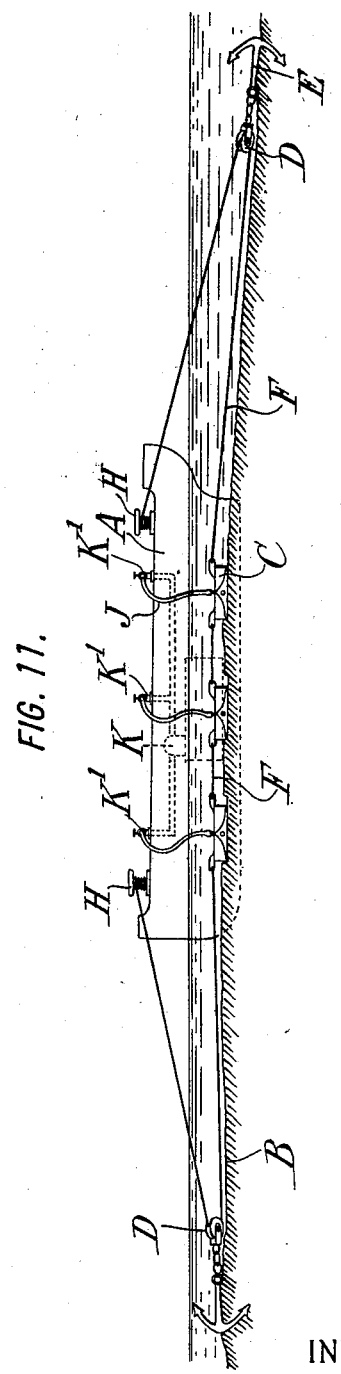
WITNESSES:
Rene Pruine
Fred White
INVENTOR:
John Arbuckle,
By Attorneys, No. 721,851. PATENTED MAR. 3, 1903.
J. ARBUCKLE.
APPARATUS FOR EXTRICATING STRANDED VESSELS.
APPLICATION FILED APR. 26, 1902.
NO MODEL. 5 SHEETS—SHEET 4.
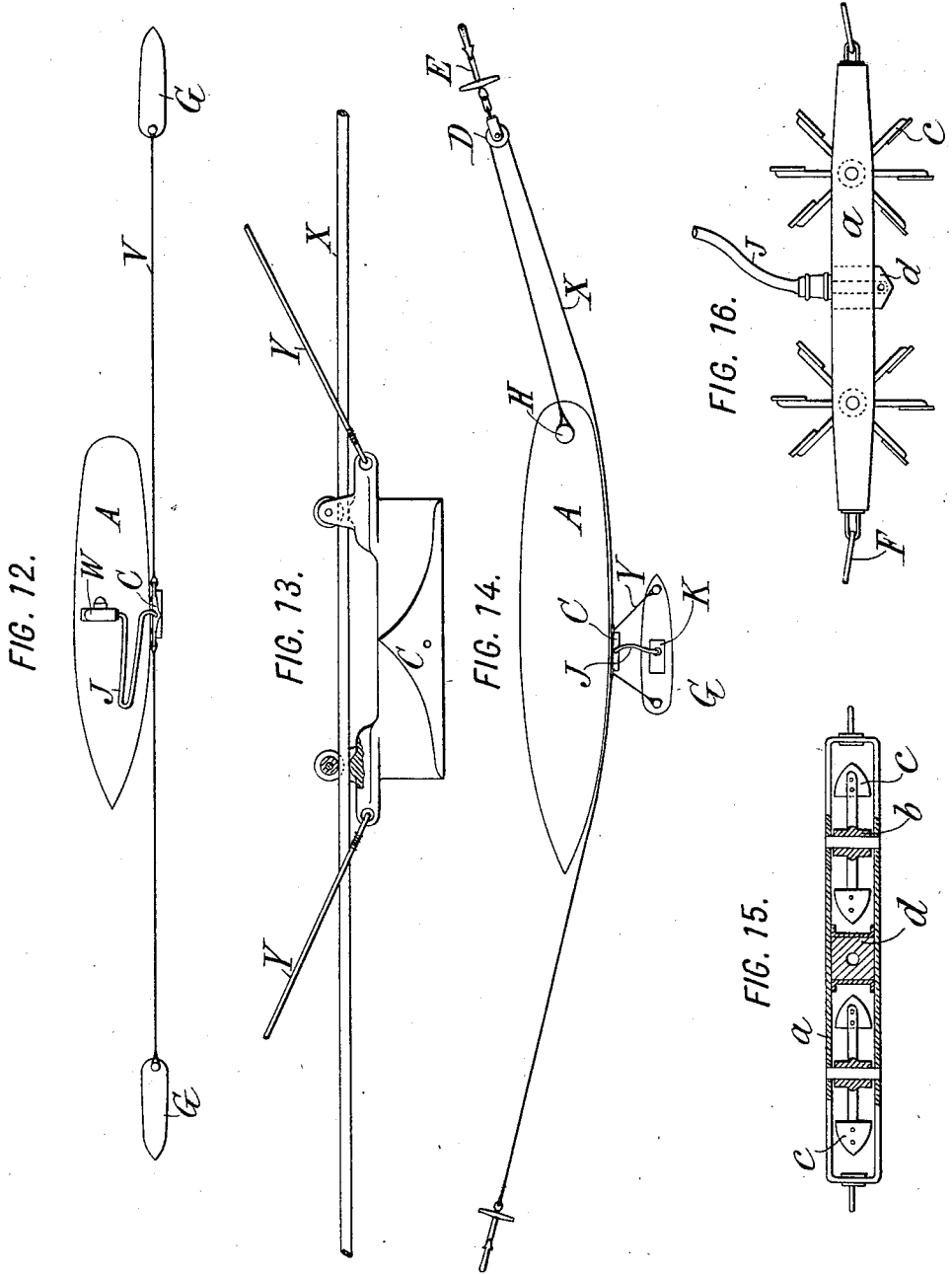
WITNESSES:
René Bruine
Fred White
INVENTOR:
John Arbuckle,
By Attorneys, No. 721,851. PATENTED MAR. 3, 1903.
J. ARBUCKLE.
APPARATUS FOR EXTRICATING STRANDED VESSELS.
APPLICATION FILED APR. 26, 1902.
NO MODEL. 5 SHEETS—SHEET 5.

WITNESSES:

INVENTOR:
John Arbuckle,
By Attorneys,

UNITED STATES PATENT OFFICE.

JOHN ARBUCKLE, OF BROOKLYN, NEW YORK.

APPARATUS FOR EXTRICATING STRANDED VESSELS.

SPECIFICATION forming part of Letters Patent No. 721,851, dated March 3, 1903.

Application filed April 26, 1902. Serial No. 104,770. (No model.)

*To all whom it may concern:*

Be it known that I, JOHN ARBUCKLE, a citizen of the United States, residing in the borough of Brooklyn, county of Kings, city and State of New York, have invented certain new and useful Improvements in Apparatus for Extricating Stranded Vessels, of which the following is a specification.

My invention aims to provide an improved apparatus whereby to facilitate the extrication of vessels which have stranded upon a bottom of mud, sand, or the like. Ordinarily vessels which become stranded, especially on a sandy bottom, become more and more firmly embedded in the sand, either by sinking of the vessel or the piling up of the sand under the action of the waves or currents. In such cases it is important that the work of extrication be undertaken quickly, and my invention provides an apparatus of extreme simplicity in operation and comprising but few parts and which can be applied very quickly and without any special machinery other than that which is usually found on steam vessels and tugboats.

Embodiments of the invention are illustrated in the accompanying drawings, in which—

Figure 1:
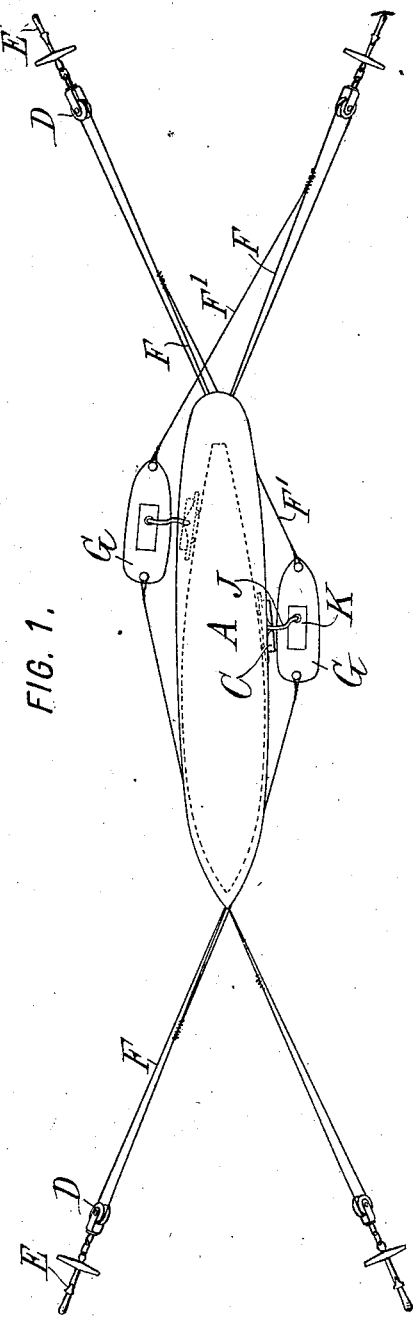
Figure 2:
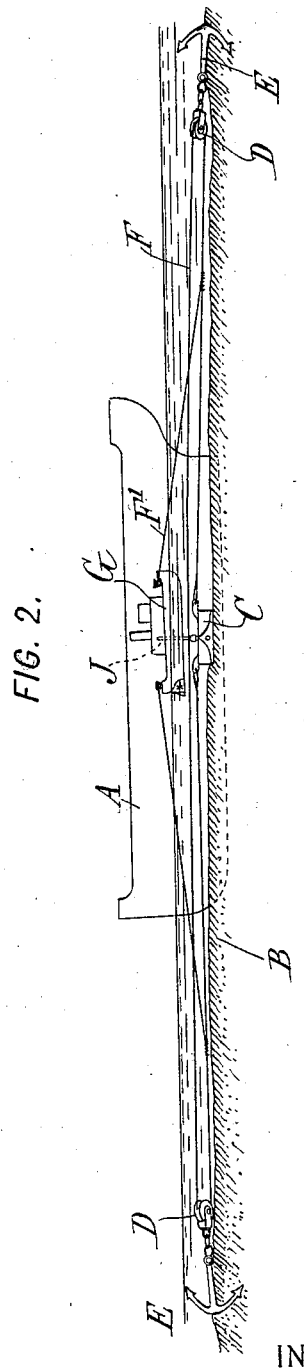
Figure 3:
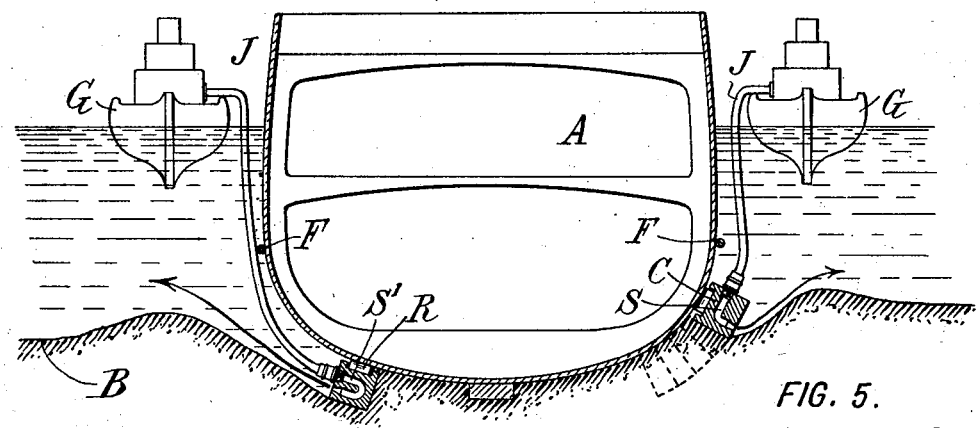
Figure 5:
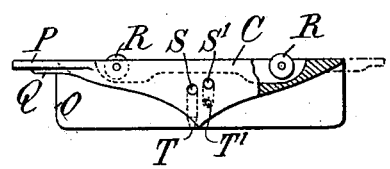
Figure 4:
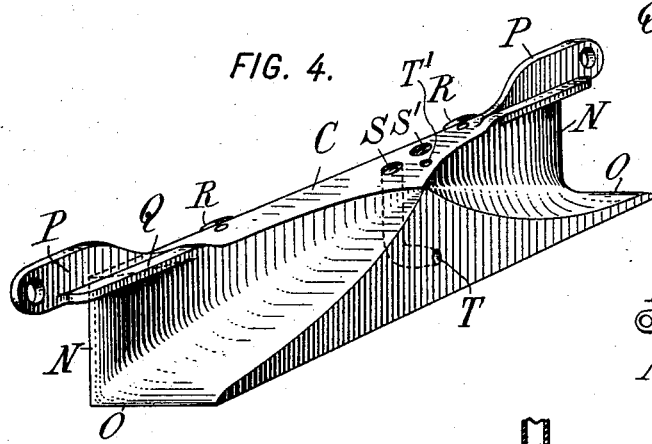
Figure 6:
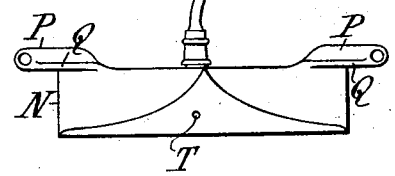
Figure 7:
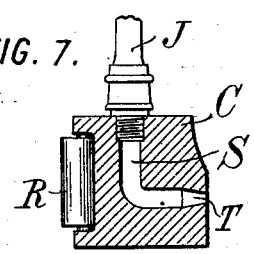
Figure 8:
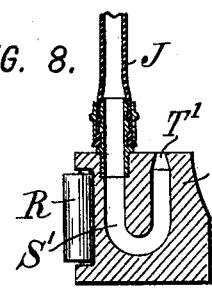
Figure 9:
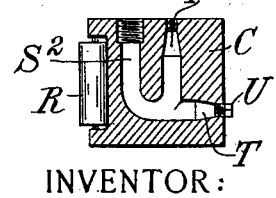
Figure 18:
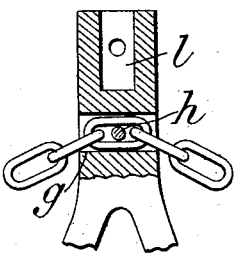
Figure 17:
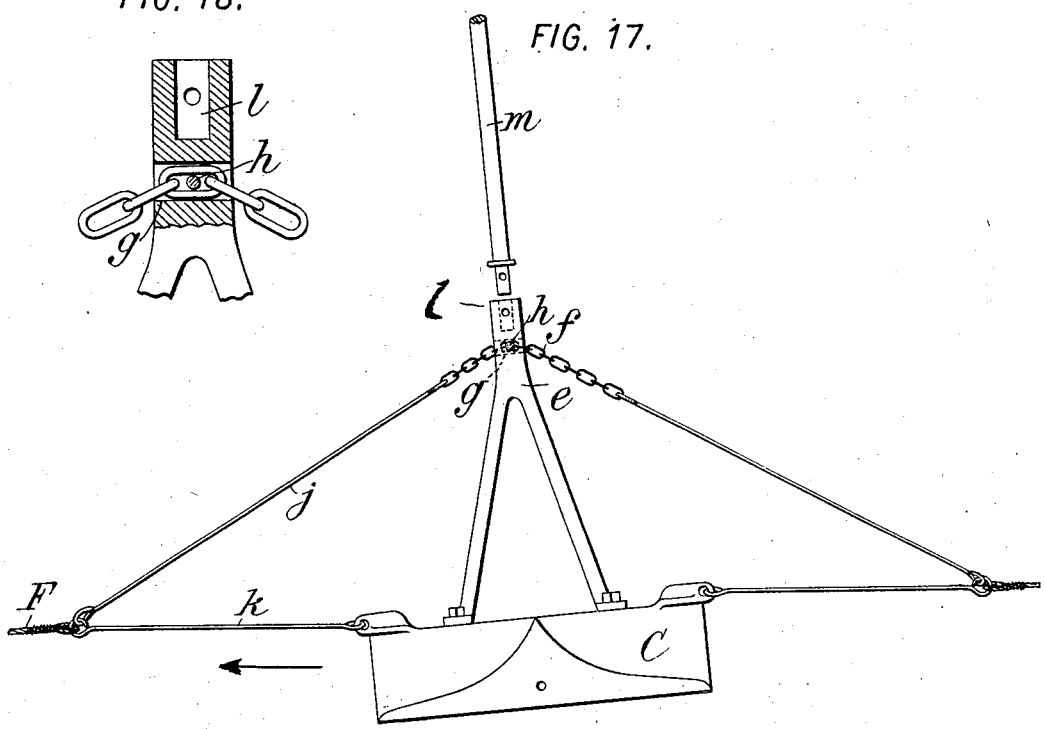
Figure 19:
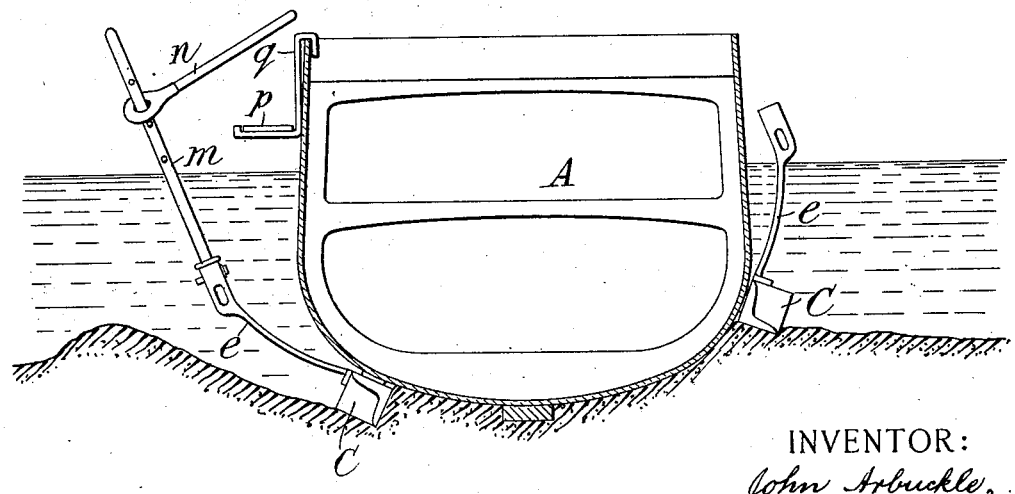

Figure 1 is a plan view of a stranded vessel with my apparatus at work. Fig. 2 is a side elevation of the same. Fig. 3 is a cross-section of the same, showing differences in the apparatus used when working at different depths. Fig. 4 is a perspective view of a plow for use in connection with my apparatus. Fig. 5 is a plan of the plow. Fig. 6 is a side elevation of the plow. Figs. 7 and 8 are cross-sections of plows. Fig. 9 is a similar section of a slightly-altered construction of plow. Fig. 10 is a diagrammatic illustration of the apparatus shown in Fig. 1. Fig. 11 is a side elevation of another embodiment of the invention. Fig. 12 is a plan of still another embodiment of the invention. Figs. 13 and 14 are a side elevation and a plan, respectively, of another embodiment. Figs. 15 and 16 are a plan and side elevation, respectively, of a different form of loosening device. Fig. 17 is a side elevation of a plow with a special device for controlling the angular position of the plow. Fig. 18 is a section of the upper end of the guiding-arm shown in Fig. 17. Fig. 19 is a section similar to Fig. 3, showing the operation of the plow illustrated in Fig. 17.

In this specification I will use the term "mud" generically to include sand or any kind of bottom soft enough for the application of my apparatus regardless of its composition.

According to my improvement I propose to extricate the vessel by loosening the mud around the same and simultaneously removing the mud, &c., from the hull of the vessel, working gradually from the surface downward until a sufficient quantity of mud is removed to float the vessel. Where the vessel has gone some distance inward upon the shoal, it may be necessary to continue the operation beyond one end of the vessel toward the deep water, so as to form a channel for the passage of the vessel into the deep water. If a vessel is not very high up on the shoal, it may only be necessary to loosen the mud about or beyond the end or side of the vessel to enable it to be drawn out by a tugboat or by its own power. For this purpose I propose to use a device for loosening the mud, preferably a plow of the shape hereinafter described more fully, and means for guiding this device alongside the hull of the vessel, such means being preferably a cable extending to fixed points, such as anchors, beyond the ends of the vessel and lying alongside the hull of the vessel. Preferably two plows and cables are operated simultaneously, one on each side of the vessel. The loosening device is dragged backward and forward alongside the hull of the vessel by any suitable means. The power for this purpose may, for example, be obtained from a tugboat attached to the loosening device and propelled backward and forward or from capstans on a tugboat or on the stranded vessel itself. Preferably I provide means for adjusting the angle of the plow with respect to the horizontal so that the forward end thereof may be inclined downward to any desired degree to enable it to cut more or less deeply. This means may be, for example, a guiding-arm or the like projecting upward from the plow and rigidly connected thereto, so that by moving the upper end of the arm forward or backward the inclination of the plow may be varied, the means for holding the upper end of the arm in the position to which it is moved being preferably a chain, cable, or the like attached at opposite ends to the cables for drawing the plow and attached at any one of a number of intermediate points to the upper end of the arm.

A feature of capital importance in connection with the improved loosening device is a means for removing the loosened mud from the hull of the vessel, which means preferably comprises a hose leading to the loosening device and through which a fluid—such as steam, compressed air, or water—is passed down into the loosened mud and escapes with considerable force in a direction to throw the loosened mud away from the hull of the vessel. The supply of fluid under pressure for this purpose may be taken either from the stranded vessel or from a tugboat or the like located alongside of the vessel.

Referring specifically to the drawings, A indicates the vessel stranded on a beach or shoal B.

C indicates a plow arranged for loosening the mud about the vessel and guided against the hull of the vessel preferably by means of a cable passing over sheaves D, attached to anchors E or other suitable fixed points. According to the embodiment shown in Figs. 1, 2, and 10 the plow C is moved backward and forward bodily by means of cables F, attached to the plow at opposite ends and extending around the two appropriate sheaves D in a complete circuit. Supplemental cables F' for moving the plow are attached to the portions of the guiding-cable F which are adjacent to the plow, as shown, whereby the plow travels in the same direction as the moving force. The movement of the plow is here obtained by attaching the upper ends of the cables F' to fixed points on a tugboat G and propelling the entire tugboat backward and forward.

For supplying fluid to the plow I propose to use a hose J, extending from a boiler or pump or the like to the plow. The boiler or pump may be the ordinary boiler or pump carried on the tug or may be on the vessel itself. Steam is the fluid ordinarily to be preferred in practicing my invention by reason of its expansive power. When it escapes into the loosened mud, it expands with great force, throwing the mud to a considerable distance, and by the action of the hull as an abutment and the suddenness of the expansion exerting a strong force to drive the mud in a direction away from the hull. In Fig. 1 the connection to a boiler K on the tug is indicated, the housing of the tug being omitted for the sake of clearness.

The length of travel of the plow beyond the end of the vessel will depend upon the abruptness of the shoal and the distance from the vessel to deep water and can be varied, of course, by extending the cables to a greater or less distance toward deep water, the position of the anchors at the outer end of the vessel being adjusted for this purpose.

A specific form of plow which I propose to use is illustrated in Figs. 4 to 9. It is double-ended, having at each end a sharp inner edge N and a similar sharp lower edge O, which edges incline inward and upward, so as to loosen the mud and force it upward and away from the hull of the vessel. I use the terms "upper" and "lower" as indicating the sides of the plow which are farthest from and nearest to the keel of the vessel, respectively, though it is clear from Fig. 3 that the upper side of the plow does not remain uppermost as the plow works from its highest position (at the right of the figure) to a lower position, (at the left.) An arm P may extend from the upper edge beyond each end for the attachment of a cable by which the plow is moved, such arm being preferably strengthened by a rib Q to give it the necessary lateral stiffness. Preferably, also, rollers R are provided on the inner face of the plow, so as to bear against the hull of the vessel and relieve the friction at this point and to prevent injury by striking of the plow against seams or projections on the hull. The plow may be recessed, as indicated. The central portion of the plow is provided with a passage S, which is connected to the hose J for the admission of the fluid which is to remove the mud loosened by the plow. Two passages S and S', Figs. 7 and 8, may be provided in the same plow, as shown in Figs. 4 and 5, for changing the direction of the exit of the fluid from the plow, so as to adapt the same more perfectly for use at different depths, or two different plows may be used, one having a passage S and the other a passage S'. Both passages have their inlet at the upper face of the plow. The passage S, however, has its outlet T on the outer face of the plow, while the passage S' has its outlet T' on the upper face of the plow. As shown in Fig. 3, the passage S is used when working with the plow in a nearly vertical position at or near the surface of the mud. The passage S' is used after some depth has been obtained and the plow is to some extent underneath the vessel, as shown at the left of Fig. 3. In the latter position the stream of fluid is more effective if thrown directly backward and upward instead of downward, as would be the case if the passage S were in use. The change from the passage S to the passage S' may be accomplished by hoisting the plow to the surface and either exchanging it for another plow having a passage S' or, in case a single plow is provided with both passages, changing the connection of the hose from the passage S to the passage S', or the plow may have a passage $S^2$, Fig. 9, connected with two outlets T and T', a plug U being used to stop the one which it is not desired to use. The outlets T T' of the passages S S' $S^2$ are shown contracted, so that the fluid shall be expelled therefrom with considerable velocity, and especially where steam or compressed air is used with a considerable expansive power, easily disintegrating and forcibly removing the mud from the face of the plow. This will not only make the movement of the plow easier, but will also enable its next cut at a lower level to be made deeper than would be the case if the mud were not removed. In dotted lines at the right of Fig. 3 I have shown approximately the successive positions which the plow takes as it is dragged backward and forward. When steam or compressed air is used, the sudden and violent expansion of the fluid when liberated from the nozzle has the effect of causing a rapid outward current to flow from the plow alongside the hull, so as to effectively carry the dislodged mud to such distance from the hull as will avoid any likelihood of its being drifted back.

As illustrated in Figs. 17 to 19, the plow may be provided with a guiding-arm $e$, extending upward from the top thereof and rigidly attached thereto, preferably by being bifurcated at its lower end and bolted directly to the plow. This arm $e$ is used for varying the inclination of the plow, so that its forward edge may be made to cut more or less deeply into the mud. The adjustment is preferably effected, as shown, by passing a chain $f$ through an eye $g$ in the upper end of the arm and attaching the arm to any desired link in the chain by means of a transverse pin $h$, the ends of the chain $f$ being connected to the cables F, which draw the plow, either by means of rods $j$ or chains or cables. The portion of the draw-cable which extends from the plow to the point of connection with $j$ may also be a single rod or cable $k$. When the plow is moving in the direction of the arrow in Fig. 17, the inclination may be as shown, being varied to an extent depending chiefly on the hardness of the bottom. When it is desired to move in the opposite direction, the pin $h$ is withdrawn and the upper end of the arm thrown over in the opposite direction and connected at another link of the chain $f$, so as to incline the plow downward at the opposite end. The arm is also advantageous in projecting above the water and showing the position and inclination of the plow, and in order to preserve this advantage when the plow moves very deeply into the water I preferably provide the upper end of the arm with a socket $l$, into which an extension-rod $m$ fits and is fastened by a cross-pin. In end view Fig. 19 the arm is preferably curved, so that as the plow moves under the vessel the upper end of the arm will not be turned too far down. At the left of the figure the extension $m$ is shown attached to the upper end of the arm, so as to project above the surface of the water and indicate at all times the position of the plow. The means shown in the other figures for conducting a stream of fluid to the loosened mud to remove the same are omitttd in Figs. 17 to 19 in order to avoid confusion; but it is understood that they may be employed, if desired.

To facilitate guiding the plow, the arm extension $m$ may be readily availed of, preferably by connecting a suitable handle to it, as shown at $n$ in Fig. 19, which handle, extending back toward the hull of the vessel, may be grasped by a man or men upon the vessel or may be engaged by any suitable rigging. To enable the men controlling this handle to walk along the side of the hull as the plow advances and without interference with the standing rigging or shrouds, it is desirable to arrange a platform $p$ alongside the exterior of the hull, which may conveniently be hung thereon by means of suitable hangers $q$, carried over the sides of the vessel at intervals.

Though I have described with great particularity of detail certain embodiments of my invention, yet it is to be understood that the invention is not limited to the specific embodiments disclosed. Various modifications in the details and in the arrangement and combination of the parts and various changes in the proportions of the parts may be made without departure from the invention. For example, as illustrated in Fig. 11, a plurality of plows C may be used connected at separated points to the cable F and moved simultaneously by the backward-and-forward movement of the cable. The movement of each of the plows is less in this case than where a single plow is used, so that in case the fluid is supplied from the vessel itself the length of hose J may be shortened by connecting each hose to a separate source of supply, such as separate steam-couplings or valved pipes K' K', supplied from the boiler K.

Fig. 11 shows a modified means of propelling the plow or plows. Instead of connecting the cable F with a tug its ends are led through the sheaves D D and carried to the bow and stern, respectively, of the stranded ship, where they are connected to the usual capstans or windlasses H H, which are operated to alternately wind on and pay out the cable, so as to drag the plows toward the bow and stern alternately.

I show in Figs. 13 and 14 (the former being an enlarged view showing only the plow and cables) an arrangement in which a cable X extends between two anchors E, placed similarly to those in the other figures, which cable serves only as a guide for the plow C, the movement of the latter being accomplished by direct connection at its opposite ends to the tug-boat G, as by means of cables Y. The guide-cable X may be fixed at its ends or may be passed through a sheave at one end and run to a capstan H on the vessel for maintaining it taut as the plow changes its depth, or, as shown in Fig. 12, a special guiding means may be dispensed with and a pair of tugs G attached by cables V to opposite ends of the plow. In this figure I illustrate also the use of water instead of steam, the hose J being connected to any suitable pump W on the vessel and being of sufficient length to permit the desired movement of the plow.

The plow also may be varied in design. A device which has substantially the same loosening effect is shown in Figs. 15 and 16. A frame $a$ carries cutters $b$, having a number of radiating blades $c$, having, preferably, pointed cutting edges. As the frame $a$ is dragged along the cutters $b$ revolve, the successive blades $c$ entering the mud and loosening it. Where a fluid is to be used, the frame is provided with a member $d$, having passages similar to those shown in Figs. 7 and 8 or in Fig. 9. The hose J is shown in Fig. 16 attached to the inlet of such a passage.

When my invention is applied to the extrication of vessels stranded in tidal waters, it is preferable to operate the plows during an ebbing tide, so that as the returning flood comes in it will float the vessel in the channel that the plows have formed, whereupon the vessel may easily be towed out into deep water.

Though I do not claim in this application for patent the improved process described, yet it is to be understood that I do not thereby waive my right to claim the same in another application.

What I claim is—

1. An apparatus for extricating a stranded vessel, comprising in combination a device for loosening the mud, and means for moving said device bodily alongside the hull of the vessel.

2. An apparatus for extricating a stranded vessel, comprising in combination a device for loosening the mud, means for guiding said device alongside the hull of the vessel, and means for removing the loosened mud from the hull of the vessel.

3. An apparatus for extricating a stranded vessel, comprising in combination a plow for loosening the mud, and means for moving said plow backward and forward alongside the hull of the vessel.

4. An apparatus for extricating a stranded vessel comprising in combination a plow for loosening the mud, means for moving said plow backward and forward alongside the hull of the vessel, and means for conducting a stream of fluid to the loosened mud to remove the same from the hull of the vessel.

5. A plow adapted to be moved alongside the hull of a vessel to loosen the mud therefrom, having an end shaped to throw the mud outward and upward, and having a passage shaped to discharge a fluid against such loosened mud.

6. A device adapted to be moved alongside the hull of a vessel to loosen the mud therefrom, having a passage adapted to discharge a fluid against such loosened mud, the outlet of said passage being contracted so as to increase the velocity of discharge of such fluid.

7. A plow adapted to be moved alongside the hull of a vessel to loosen the mud therefrom, having an end shaped to throw the mud outward and upward, and having a passage shaped to discharge a fluid from the outer face of the plow.

8. A plow for loosening the mud from the hull of a vessel, having an end shaped to throw the mud outward and upward, and having a passage shaped to discharge a fluid from the upper face of the plow.

9. A plow for loosening the mud from the hull of a vessel, having an end shaped to throw the mud upward and outward, and having rollers on its inner face to bear against the hull of the vessel.

10. In apparatus for extricating a stranded vessel, the combination of a loosening device, an anchor adapted for arrangement beyond one end of the vessel, means for moving said loosening device, and means connected to said anchor for guiding the movement of said loosening device.

11. In apparatus for extricating a stranded vessel, the combination of a loosening device, a pair of anchors adapted for arrangement beyond the opposite ends of the vessel, sheaves connected to said anchors, and cables running from said loosening device around said sheaves and connected to a source of power.

12. In apparatus for extricating a stranded vessel, the combination of a loosening device, a pair of anchors adapted for arrangement beyond the opposite ends of the vessel, sheaves connected to said anchors, a guiding-cable running from said loosening device around both sheaves, and supplemental cables connecting the portions of the guiding-cable which are adjacent to the loosening device to a source of power, whereby the loosening device is caused to travel in the same direction as the moving force.

13. In apparatus for extricating a stranded vessel, the combination of a double-ended plow, having a passage shaped to discharge a fluid against the mud loosened by said plow, a pair of anchors adapted for arrangement beyond the opposite ends of the vessel, sheaves connected to said anchors, cables running from said plow around said sheaves and connected to a source of power, and a hose connected at one end to said passage, and at its opposite end to a fluid-supplying means.

14. An apparatus for extricating a stranded vessel, comprising in combination a plow for loosening the mud, means for moving said plow alongside the hull of the vessel, and means for adjusting the inclination of the plow.

15. An apparatus for extricating a stranded vessel, comprising in combination a plow for loosening the mud, means for moving said plow backward and forward alongside the hull of the vessel, an arm projecting upward from said plow, and means for holding said arm in an inclined position for adjusting the inclination of said plow.

16. An apparatus for extricating a stranded vessel, comprising in combination a plow for loosening the mud, drawing-cables attached to opposite ends of said plow for moving the same backward and forward alongside the hull of the vessel, an arm projecting upward from said plow, a flexible connector connected at opposite ends to the opposite drawing-cables respectively, and means for attaching said flexible connector at any one of several intermediate points to the top of said arm.

17. An apparatus for extricating a stranded vessel, comprising in combination a plow for loosening the mud, means for moving said plow backward and forward alongside the hull of the vessel, an arm projecting upward from said plow, and means for attaching an extension to said arm to extend above the surface of the water.

In witness whereof I have hereunto signed my name in the presence of two subscribing witnesses.

JOHN ARBUCKLE.

Witnesses:
  THEO. T. SNELL,
  FRED WHITE.